United States Patent
Jagannath et al.

(10) Patent No.: US 10,432,734 B2
(45) Date of Patent: Oct. 1, 2019

(54) CLOUD SERVICE TUNING

(71) Applicant: HEWLETT PACKARD ENTERPRISE DEVELOPMENT LP, Houston, TX (US)

(72) Inventors: Kishore Jagannath, Bangalore (IN); Santhosh Srinivas, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 273 days.

(21) Appl. No.: 15/528,277

(22) PCT Filed: Jun. 30, 2015

(86) PCT No.: PCT/US2015/038532
§ 371 (c)(1),
(2) Date: May 19, 2017

(87) PCT Pub. No.: WO2016/093887
PCT Pub. Date: Jun. 16, 2016

(65) Prior Publication Data
US 2017/0331907 A1 Nov. 16, 2017

(30) Foreign Application Priority Data
Dec. 12, 2014 (IN) .......................... 6287/CHE/2014

(51) Int. Cl.
*G06F 15/173* (2006.01)
*H04L 29/08* (2006.01)
(Continued)

(52) U.S. Cl.
CPC .......... *H04L 67/16* (2013.01); *H04L 41/0823* (2013.01); *H04L 43/0817* (2013.01); *H04L 43/16* (2013.01); *H04L 67/10* (2013.01)

(58) Field of Classification Search
USPC ................................. 709/224, 226, 220, 221
See application file for complete search history.

(56) References Cited

U.S. PATENT DOCUMENTS 8,521,501 B2 8/2013 Alam et al.
2006/0101224 A1 5/2006 Shah et al.
(Continued)

FOREIGN PATENT DOCUMENTS

EP 2669799 A1 12/2013
WO WO-2014025584 A1 2/2014
WO WO-2014088542 A1 6/2014

OTHER PUBLICATIONS

Dimuthu Leelarathne, "Nurturing Applications in a Connected Enterprise with WSO2 App Factory," Jun. 6, 2014, pp. 1-7 [online], WSO2, [retrieved on Oct. 20, 2014], Retrieved from the Internet: <URL: http://wso2.com/library/articles/2014/06/nurturing-applications-in-a-connected-enterprise/?utm_source=dzone&utm_medium=banner &utm_content=resourcespage&utm_campaign=cloudzoneaug14>.
(Continued)

Primary Examiner — Lan Dai T Truong
(74) Attorney, Agent, or Firm — Hewlett Packard Enterprise Patent Department

(57) ABSTRACT

According to an example, to tune a cloud service, an event and an event type on a cloud server application are detected by monitoring at least one of a hardware value and a software value. An application parameter to tune is determined based on the event type, and a tuning priority of the application parameter based on historical tuning data is fetched. The application parameter is tuned by modifying a software variable. In the event that tuning the application parameter resolves the event type, the tuning priority of the parameter is increased. In the event that tuning the parameter fails to resolve the event type, the parameter priority is decreased, the tuning is rolled back, and a default tune setting is invoked.

15 Claims, 4 Drawing Sheets

(51) Int. Cl.
*H04L 12/24* (2006.01)
*H04L 12/26* (2006.01)

(56) References Cited

U.S. PATENT DOCUMENTS

| | | |
|---|---|---|
| 2009/0183162 A1 | 7/2009 | Kindel et al. |
| 2014/0143402 A1 | 5/2014 | Liu et al. |
| 2014/0215058 A1 | 7/2014 | Vicat-Blanc et al. |
| 2014/0215077 A1 | 7/2014 | Soudan et al. |

OTHER PUBLICATIONS

International Search Report and Written Opinion, International Application No. PCT/US2015/038532, dated Oct. 13, 2015, pp. 1-7, KIPO.

CLOUD SERVICE TUNING

BACKGROUND

Cloud computing services have become an increasingly popular alternative to purchasing and maintaining computer equipment locally, particularly at the enterprise level. The cloud computing market now includes a myriad of service types and service levels of varying scope, scalability, and performance.

DETAILED DESCRIPTION

Figure 1:
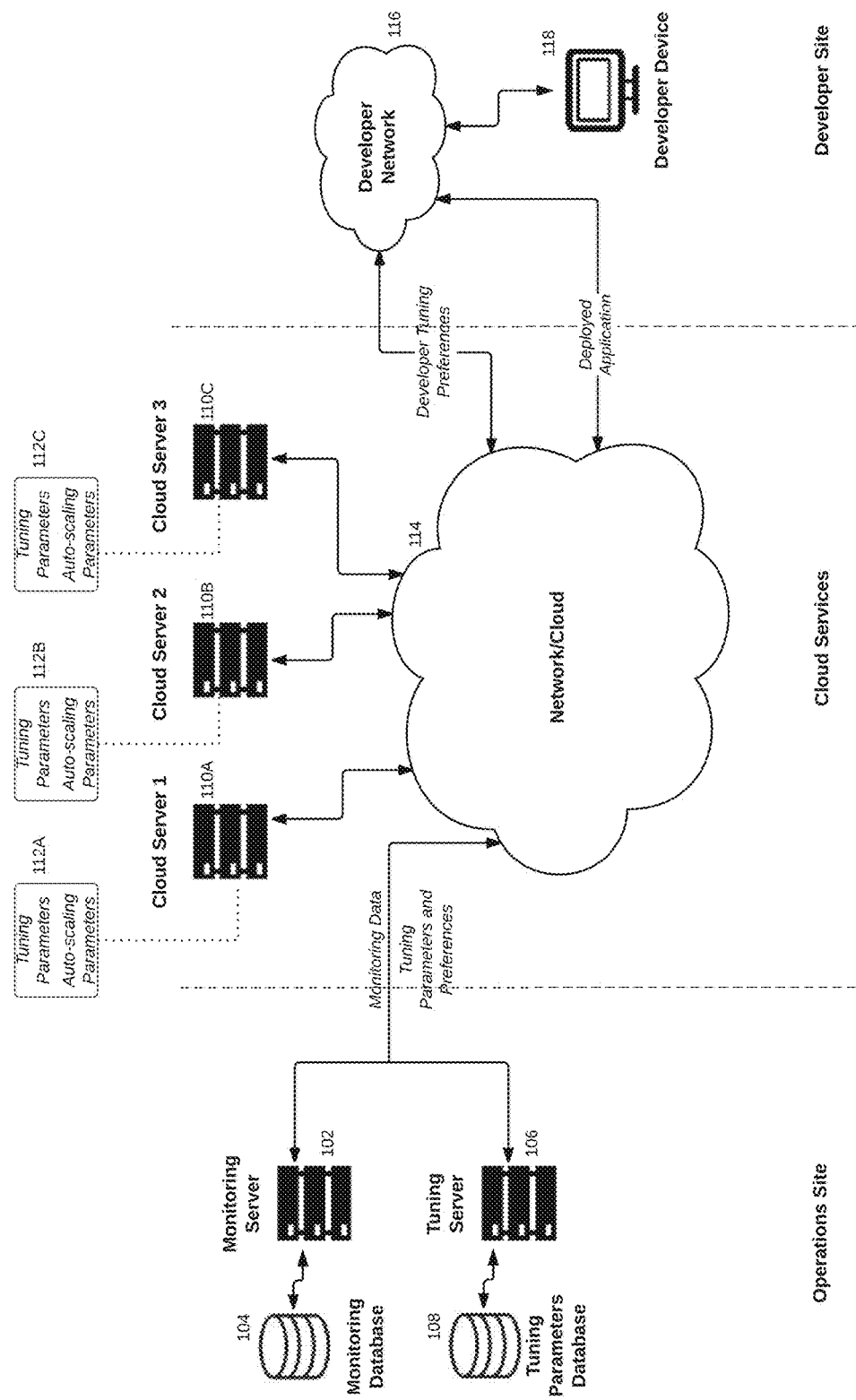
FIG. 1 illustrates a cloud system including a developer, cloud servers, and an operations site, according to an example of the present disclosure.

Various embodiments described below provide for automatic or "self" tuning of a cloud server or cloud application on a cloud server, or auto-remediation of events detected on a cloud server by tuning a parameter or parameters based on a priority level and other data. In some embodiments, tuning parameters are exposed by application developers, along with other data, during the application development and/or deployment process to enable self-tuning or auto-remediation based on certain criteria.

Cloud computing services (hereinafter simply "cloud services") may comprise servers, databases, networking equipment, and other computing equipment maintained by a cloud computing provider, commonly referred to as a cloud service provider or CSP. Cloud services may include virtual machines or other distributed processing systems that may be used to host servers, websites, software, databases, and other cloud applications in the consumer, commercial, and industrial sectors.

Cloud services and cloud applications may be accessed by computing systems, devices, and electronic components such as desktop computers, laptop computers, servers, thin clients, tablets, smartphones, digital video recorders, retail point of sale devices, and other computing equipment (hereinafter "device" or "devices"). Access may be provided via public or private networks, such as the internet or intranets.

In response to the variable demand for cloud services at any given time, techniques such as auto scaling (also known as "autoscaling" or "auto-scaling") may be used to dynamically adjust available computing resources available to a cloud service application at any given time, so that an application does not need to provision a high-level of resources even during times of low demand. For example, auto scaling may allow a cloud service to dynamically increase or decrease the number of virtual machines running a particular cloud service application. Auto scaling may be based on a trigger such as server performance, application performance, response times, or site traffic, as examples.

While auto scaling may be beneficial to a subscriber of cloud services by reducing overall cost to run a cloud application, auto scaling may not be the most efficient technique for adapting to events on a server such as performance degradation or increased traffic, either from the perspective of computational efficiency or cost-effectiveness. For example, auto scaling may be a generic approach to resolving performance issues on a cloud application that may come at a significant financial cost. In contrast, a more tailored approach, such as tuning application parameters, may resolve the same issues at no cost.

As a specific example, a monitoring tool may detect that a CPU utilization rate on a server running a cloud application is high and reaching or exceeding a threshold. A generic approach to resolving the high CPU utilization rate may be to auto scale the cloud services to allow for more computing resources, e.g., to allocate more CPUs, to the particular cloud application. However, the primary cause of the high CPU utilization rate may be an issue or event such as a high number of threads configured in a thread pool causing a context switching overhead issue. In this example, lowering the number of threads in the thread pool by tuning an application parameter, at no financial cost, may be an effective or more effective solution to resolving the issue than simply increasing overall computing resources available to the application, e.g., by auto scaling.

However, tuning a particular application parameter may require knowledge of the development and intricacies of the application. In cases where an application is developed by a development team and then passed to an operations team, the development details are often lost, restricting the ability to optimally self-tune the application once deployed, or to do so in a timely fashion to prevent, e.g., application outages resulting from an unexpected load or traffic increase.

According to an example, to tune a cloud service, an event and an event type on a cloud server application are detected by monitoring at least one of a hardware value and a software value. An application parameter to tune is determined based on the event type, and a tuning priority of the application parameter based on historical tuning data is fetched. The application parameter is tuned by modifying a software variable. In the event that tuning the application parameter resolves the event type, the tuning priority of the parameter is increased. In the event that tuning the parameter fails to resolve the event type, the parameter priority is decreased, the tuning is rolled back, and a default tune setting is invoked.

FIG. 1 illustrates a cloud system including a developer, cloud servers, and an operations site, according to an example of the present disclosure.

In an example, the operations site includes a monitoring server 102 which may be coupled to a monitoring database 104. Server 102 and database 104 may monitor, receive, calculate, and/or store data related to various cloud services, such as names, descriptions, service types, performance metrics, historical data, and other information. In some examples, users of the cloud servers discussed below may grant permission or opt-in to be monitored by monitoring server 102.

Tuning server 106 may be coupled to a tuning parameters database 108. Server 106 and database 108 may receive, calculate, and/or store data related to tunable parameters that may be tuned on a particular cloud server or in a particular cloud application, including historical tuning data and priority levels, discussed below in more detail. Tuning server 106 may also store tuning parameters set by a developer pre-deployment or post-deployment.

In some embodiments, the functions of monitoring server 102 and tuning server 106 may be incorporated directly into a cloud server running a cloud application, as discussed below in more detail with respect to servers 110A-C.

Network or cloud 114 may connect the operations site with cloud service providers and customers, discussed in more detail below. Network or cloud 114 may be any public or private network such as the internet or intranets.

Cloud servers 110A-C may represent any cloud service hardware and/or software available to run a cloud application. Various applications and service types may run on cloud servers 110A-C. For example, cloud servers 110A-C may offer web host, database, and/or software applications or service types. Cloud servers 110A-C may also store tuning parameters and auto scaling parameters 112A-C, including those set by a developer pre-deployment or post-deployment.

Developer device 118 may be any device such as a computer used by a device to access cloud servers 110A-C or to deploy a cloud application to cloud servers 110A-C. Developer device 118 may also be used to transmit data such as developer tuning preferences or priorities, discussed in more detail below, to cloud servers 110A-C or to the operations site.

Figure 2:
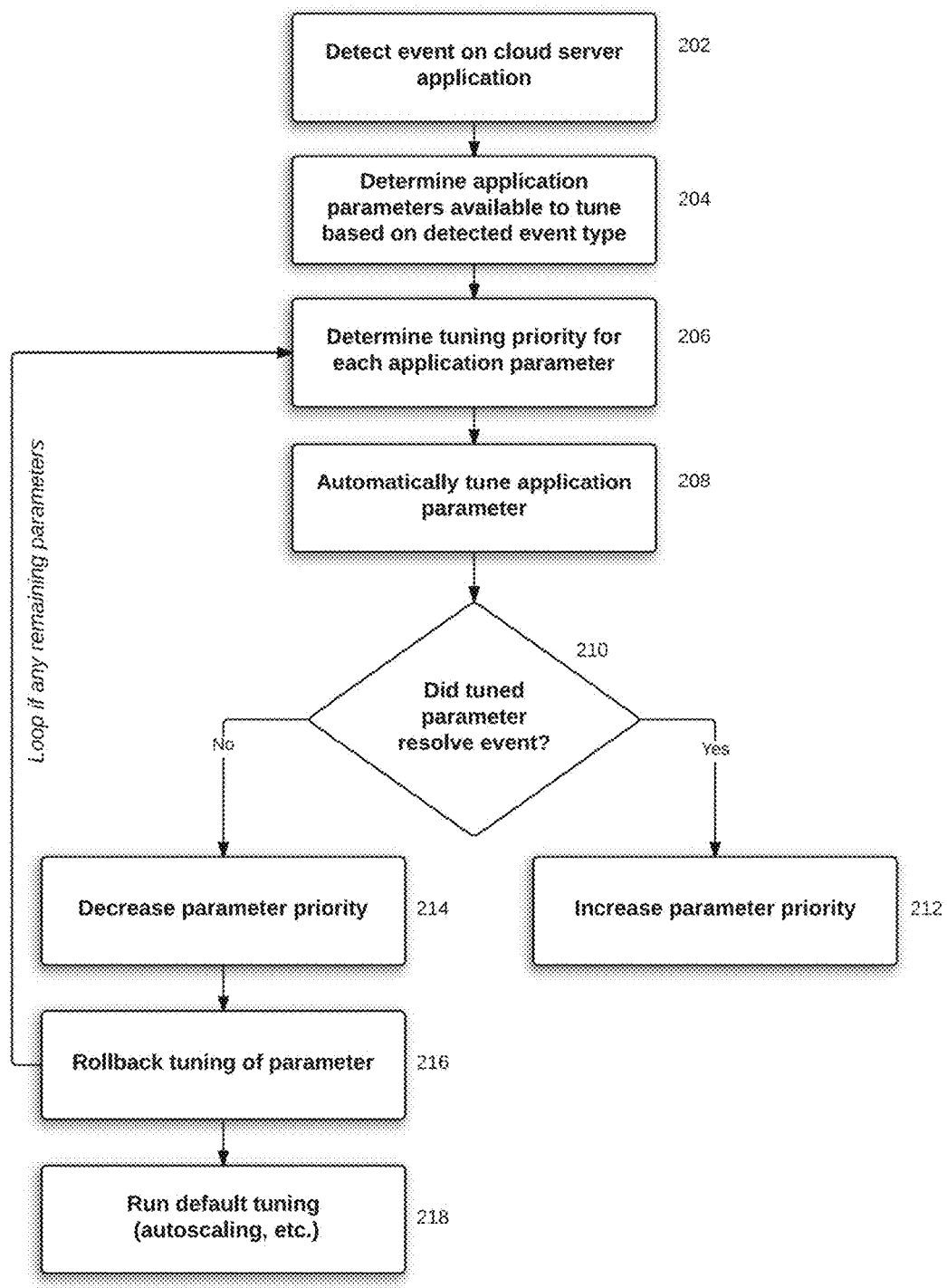
FIG. 2 illustrates a flowchart of tuning a cloud service application, according to an example of the present disclosure.

FIG. 2 illustrates a flowchart of tuning a cloud service application, according to an example of the present disclosure. In block 202, an event is detected on a cloud server application. In some examples, the event may be a performance degradation event type, while in other examples the event may be a threshold level alert. The event may be detected based on monitoring of a hardware variable or a software variable, or other metrics, values, or inputs, such as the CPU utilization or response time examples discussed herein.

In block 204, application parameters available to tune may be determined based on the event type. During development and/or deployment of a cloud application, as discussed below in more detail with respect to FIG. 3, various parameters may be identified as tunable, and more specifically as tunable in a production environment. For example, as discussed above, the number of threads in a thread pool configuration file for a cloud application may be identified as a parameter (or value or variable) that is tunable once a cloud application is deployed to a test or production cloud server. As other examples, a database connection size or a caching value may be tunable parameters. Parameters may be related to the application itself, or other parameters that interface with the application such as system parameters.

As discussed below in more detail with respect to FIG. 3, the tunable parameters may be associated with an event type. For example, a CPU performance degradation event type detected on a cloud server may be associated with the thread pool parameter and other CPU-related parameters, while a database threshold level event type may be associated with a database connection size parameter or caching parameters. In each case, the tunable or "exposed" parameters may be determined in block 204 by, for example, retrieving a list of developer-exposed parameters or scanning the cloud application.

In block 206, a tuning priority for each parameter may be determined. A tuning priority may be a value to indicate the order of parameters to be tuned, from a first priority to a last priority, and may be grouped by each event type. For example, a database-related event type may have a database connection size parameter and a caching parameter exposed for tuning in production, with the database connection size having a priority of 1, and the caching parameter having a priority of 2. In examples where two parameters have the same priority level, a secondary rule such as time of creation may be used.

In some examples, the tuning priority may have been adjusted previously, either by the flow of FIG. 2 or by a developer setting, and thus the current priority may be based on historical data.

In block 208, self-tuning or "auto-remediation" of the parameters may commence, with the highest-priority parameter the first to be tuned. Tuning a parameter may comprise adjusting a software or firmware variable or value on the cloud server, such as increasing a number of worker threads or decreasing a cache size.

In block 210, a determination may be made as to whether the tuned parameter resolved the event type. For example, a determination may be made as to whether increasing the number of worker threads resolved a CPU-related event type by determining whether the CPU utilization rate has been lowered or whether CPU performance has improved. The determination of block 210 may be based on an updated monitoring or detection, as discussed above with respect to block 202. In some examples, the updated monitoring or detection may occur at a preset time interval after tuning a parameter, to allow the parameter tuning to take effect.

If the tuned parameter resolved the event type, and if the parameter priority is not already at the highest level, the priority of the parameter may be increased in block 212 for future tuning. For example, if a first loop of the flow of FIG. 2 did not resolve the event type by tuning a database connection size with a priority 1, but did resolve the event type by tuning a caching parameter having a priority of 2, the caching parameter priority may be upgraded or promoted to a priority level of 1. Similarly, if the tuned parameter did not resolve the event type, and if the priority is not already at the lowest level, the priority of the parameter may be decreased in block 214 for future tuning. The priority levels may be stored as historical data, e.g., on tuning server 108 or cloud servers 110A-C, or transmitted back to a developer.

In block 216, if the tuned parameter did not resolve the event type, the parameter tuning may be rolled back. In some examples, the parameter may be rolled back by adjusting a single software variable or value. In other examples, the roll back may require adjusting several settings, or rolling back to an earlier version or state of a server image, virtual server image, operating system image, firmware image, or application image. Rolling back the tuning may allow for a more accurate reading of whether or not a particular parameter tuning was effective in resolving an event type. In some examples, the roll back step may be omitted such that parameter tuning may be "on top" of a previous tuning of another parameter.

In some examples, block 216 may flow back to block 206 if additional parameters of lower priority are to be tuned. In other examples, the flow from block 216 may loop back to block 208, i.e., the same parameter may be tuned incrementally or iteratively. As one example, a database cache size parameter may be tuned in steps before progressing to a lower-priority parameter, if necessary. A maximum allowable count of tuning attempts may be set for a single parameter, or across all parameters.

In block 218, if tuning all available parameters as shown in the loop of blocks 206 through 216 has not resolved the event type, a default tuning action may be invoked on the cloud server. For example, an auto scaling function may be called to increase overall computing resources on the cloud server or service available to the cloud application.

In some examples, a report of the tuning parameters, priorities, and changes to the priorities may be output to a developer. The report may be useful to developers in identifying and setting parameters and tuning preferences both pre-deployment and post-deployment, which may later be transmitted back to the cloud services or operations site though the flow of FIG. 2.

Figure 3:
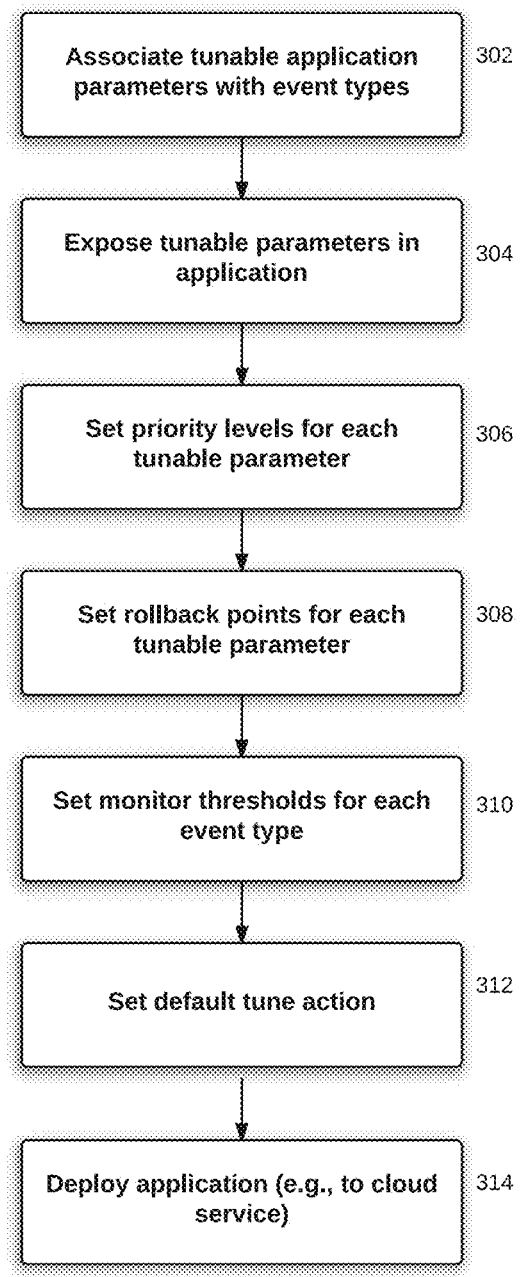
FIG. 3 illustrates a flowchart of deploying a tunable cloud service application, according to an example of the present disclosure.

FIG. 3 illustrates a flowchart of deploying a tunable cloud service application, according to an example of the present disclosure. In some examples, the flow of FIG. 3 may occur pre-deployment or post-deployment of a cloud application by a software developer.

In an example, in block 302, tunable application parameters may be associated with event types, as discussed above. The association may be based on a rule or set of rules based on a known association between an event type and a parameter or parameters.

In block 304, the tunable parameters may be set for exposure or visibility to a cloud server, or to an operations team. Exposing the parameter may involve setting the cloud application to accept incoming requests to adjust or tune a particular parameter, which may not otherwise be accessible or visible to a cloud server or operations team, for example. In some examples, exposing tunable parameters may also comprise a security or signature verification to restrict the entities able to read, modify, or tune the parameters.

In block 306, the priority levels for each tunable parameter may be set, and in some examples, the priorities for each parameter may be adjustable based on a particular event type or a developer preference. For example, a database connection size parameter may be set with a priority 1, while a caching parameter may be set with a priority of 2, for a database performance degradation event type. In the example of a CPU performance degradation event type, the priority levels may be set lower for such database-related parameters.

The priority levels may be based on a known association between an event type and the relative success or failure of a particular parameter in resolving the event type. In some examples, the priority levels may be set with input from the report of FIG. 2 discussed above.

In block 308, a rollback point for each tunable parameter may be set. In some examples, the rollback point may be the point in time immediately before the last parameter was tuned. In other examples, the rollback point may be the last time a service patch or other update was installed.

In block 310, monitor thresholds for each event type may be set. For example, for a particular cloud application, a CPU monitor threshold of 80% utilization may be set, or a connection response time threshold of 100 milliseconds may be set. The thresholds, ranges, or other variables of block 310 may be used on the cloud server to determine when to trigger an event and invoke self-tuning or auto-remediation as discussed with respect to FIG. 2.

In block 312, a default tune setting or action may be set. In some examples, the default tune action may be an auto scaling function. In other examples, the default tune action may comprise alerting an operations team.

In block 314, the application may be deployed to the operations team or to a cloud service or server, e.g., for release to production.

Figure 4:
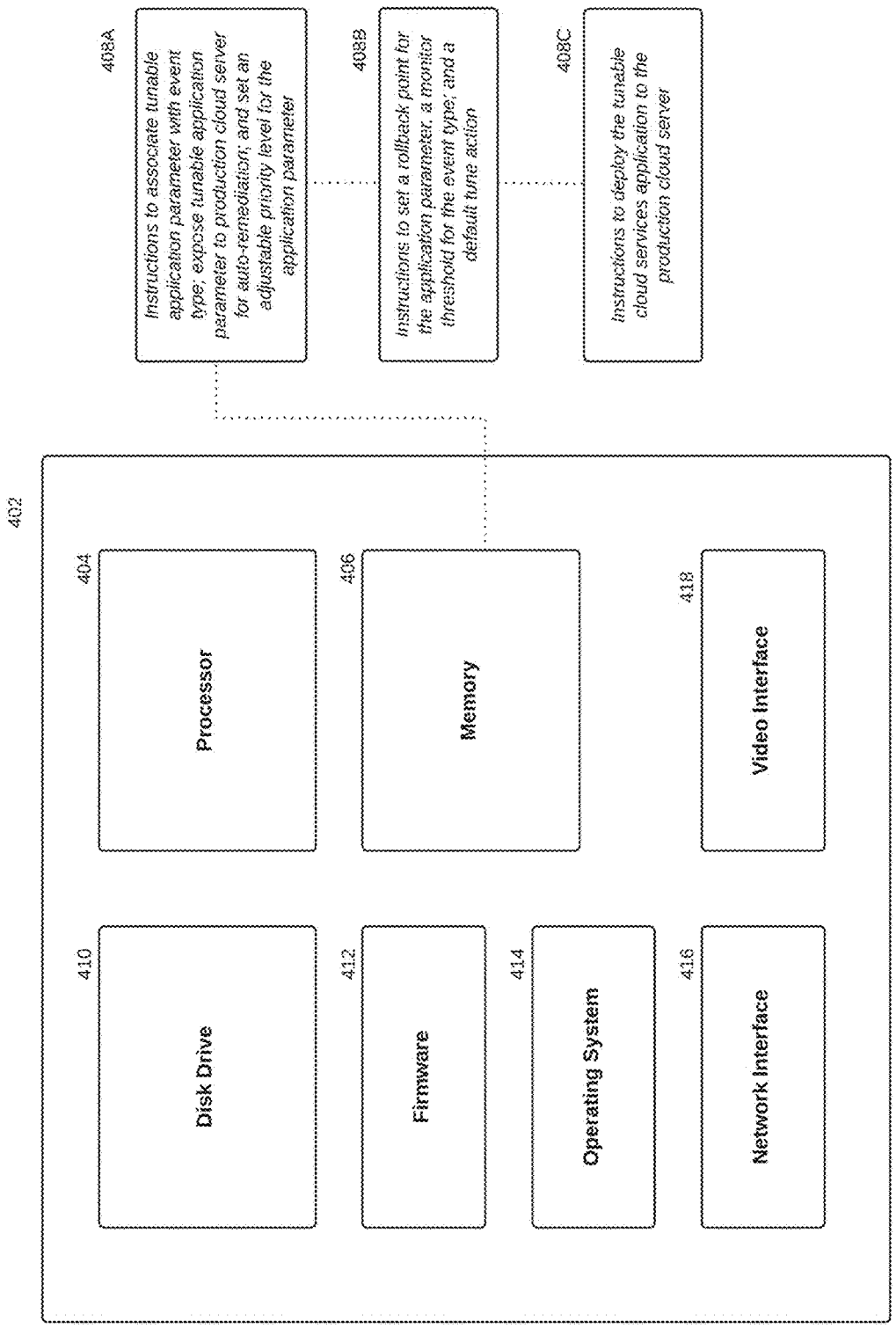
FIG. 4 illustrates a schematic representation of a computing device that may be used as a platform for implementing or executing at least one of the processes depicted in FIGS. 2-3, according to an example of the present disclosure.

FIG. 4 illustrates a schematic representation of a computing device that may be used as a platform for implementing or executing at least one of the processes depicted in FIGS. 2-3, according to an example of the present disclosure.

In an example, device 402 comprises a processing resource such as processor or CPU 404; a memory resource 406 such as memory, RAM, ROM, or Flash memory; a disk drive 410 such as a hard disk drive or a solid state disk drive; a firmware 412; an operating system 414; and a network interface 416 such as a Local Area Network LAN card, a wireless 802.11x LAN card, a 3G or 4G mobile WAN, or a WiMax WAN card. Each of these components may be operatively coupled to a bus.

Some or all of the operations set forth in the figures may be contained as a utility, program, or subprogram in any desired computer readable storage medium, or embedded on hardware. The computer readable medium may be any suitable medium that participates in providing instructions to the processing resource 404 for execution. For example, the computer readable medium may be non-volatile media, such as an optical or a magnetic disk, or volatile media, such as memory. The computer readable medium may also store other machine-readable instructions, including instructions downloaded from a network or the internet.

In addition, the operations may be embodied by machine-readable instructions. For example, they may exist as machine-readable instructions in source code, object code, executable code, or other formats.

Device 402 may comprise, for example, a computer readable medium that may comprise instructions 408A-C to associate at least one tunable application parameter with at least one event type; expose the at least one tunable application parameter to a production cloud server for auto-remediation on the production cloud server; set an adjustable priority level for the at least one application parameter; set a rollback point for the at least one application parameter; set a monitor threshold for the at least one event type; set a default tune action; and deploy the tunable cloud services application to the production cloud server.

The computer-readable medium may also store an operating system such as Microsoft Windows, Mac OS, Unix, or Linux; network applications such as network interfaces and/or cloud interfaces; and a cloud broker service, monitoring tool, or metrics tool, for example. The operating system may be multi-user, multiprocessing, multitasking, and/or multithreading. The operating system may also perform basic tasks such as recognizing input from input devices, such as a keyboard or a keypad; sending output to a display; keeping track of files and directories on a medium; controlling peripheral devices, such as drives, printers, or image capture devices; and/or managing traffic on a bus. The network applications may include various components for establishing and maintaining network connections, such as machine readable instructions for implementing communication protocols including, but not limited to, TCP/IP, HTTP, Ethernet, USB, and FireWire.

In certain examples, some or all of the processes performed herein may be integrated into the operating system. In certain examples, the processes may be at least partially implemented in digital electronic circuitry, in computer hardware, in machine readable instructions (such as firmware and/or software), or in any combination thereof.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A method of tuning a cloud service, comprising:
   detecting an event and an event type on a cloud server application by monitoring at least one of a hardware value and a software value on a cloud server;
   determining at least one exposed application parameter to tune based on the event type;
   determining a tuning priority of the at least one application parameter based on historical tuning data;
   automatically tuning the at least one application parameter by modifying a software variable on the cloud server; and
   in the event that tuning the at least one application parameter resolves the event type, increasing the tuning priority of the at least one application parameter, and
   in the event that tuning the at least one application parameter fails to resolve the event type, decreasing the priority of the at least one application parameter, rolling back the tuning of the at least one application parameter, and transmitting an instruction to invoke a default tune setting.

2. The method according to claim 1, wherein automatically tuning the at least one application parameter further comprises looping through an order of priority.

3. The method according to claim 1, wherein the event type comprises a performance degradation alert.

4. The method according to claim 1, wherein the event type comprises a threshold level alert.

5. The method according to claim 1, wherein the at least one application parameter comprises at least one of a database connection size, a caching value, a connection pool thread value, and a worker threads value.

6. The method according to claim 1, wherein automatically tuning the application parameter comprises tuning the application parameter incrementally.

7. The method according to claim 1, where modifying a software variable on the cloud server comprises at least one of increasing a variable, decreasing a variable, and toggling a variable.

8. The method according to claim 1, wherein the default tune setting comprises an auto scaling function.

9. A system for tuning a cloud service, the system comprising a processing resource in communication with a network interface, a computer readable medium, wherein the computer readable medium contains a set of instructions, and a processing unit to carry out a set of instructions to:
   detect, on the processing resource, a first monitoring event and an event type on a cloud server application;
   determine at least one application parameter exposed in the cloud server application;
   determine an order of priority for tuning the at least one application parameter based on the detected event type;
   tune the application parameter;
   detect, on the processing resource, a second monitoring event on the cloud server application; and
   determine whether the second monitoring event indicates that the first monitoring event has been resolved, wherein
   in the event that the first monitoring event is not resolved, the processing resource is to decrease the priority of the at least one application parameter, roll back the tuned application parameter to a previous state, and invoke an auto-scaling function.

10. The system according to claim 9, wherein the first monitoring event comprises at least one of a CPU alert, a memory alert, a disk drive alert, a bandwidth alert, and an application alert.

11. The system according to claim 9, wherein the previous state comprises a virtual machine image.

12. The system according to claim 9, wherein the instructions are to detect, on the processing resource, the second monitoring event on the cloud server application at a pre-set time after the application parameter is tuned.

13. A non-transitory computer readable storage medium on which is embedded a computer program, said computer program to deploy a tunable cloud services application, said computer program comprising a set of instructions to:
   associate at least one tunable application parameter with at least one event type;
   expose the at least one tunable application parameter to a production cloud server for auto-remediation on the production cloud server;
   set an adjustable priority level for the at least one application parameter;
   set a rollback point for the at least one application parameter;
   set a monitor threshold for the at least one event type;
   set a default tune action for the at least one application parameter; and
   deploy the tunable cloud services application to the production cloud server.

14. The computer readable storage medium according to claim 13, wherein the event type is based on an application response time.

15. The computer readable storage medium according to claim 13, wherein the default tune action comprises an instruction to increase resources available to the production cloud server.

* * * * *